Patented Mar. 28, 1950

2,502,401

UNITED STATES PATENT OFFICE 2,502,401

MANUFACTURE OF DIPHOSPHORIC ESTERS

Leonard W. Harris, Richmond, George R. Sanders, El Cerrito, and James W. Hansen, Berkeley, Calif., assignors to California Spray-Chemical Corporation, Richmond, Calif., a corporation of Delaware No Drawing. Application June 18, 1947, Serial No. 755,472

7 Claims. (Cl. 260—461)

1

This invention relates to a method of making diphosphoric esters having valuable properties, especially for use in controlling insect and other pests.

We have discovered that by contacting trialkyl phosphate with chlorine in the presence of phosphorus or a chloride of phosphorus, under the conditions hereinafter described we are able to obtain alkyl chloride and a liquid product which is very toxic to many animals, rodents and insects, and yet which can be applied in lethal concentration without injury to plant tissue or to fabrics infested with rodent or insect pests. Moreover, the said product is very unstable when exposed in dispersed form to the atmosphere, forming decomposition products which are non-toxic.

The liquid product of the method of our invention is a complex mixture of phosphates, but owes its toxic property largely to a certain phosphoric ester which it contains in substantial amount. This toxic compound can be separated from the reaction product in substantially pure form by distillation under extremely high vacuum, as in a suitable type of "molecular" still. It is a tetraethyl alkyl ester of a diphosphoric acid, although its specific formula has not been proved conclusively. The basic reaction leading to its formation involves the reaction of one mol of chlorine with two mols of trialkyl phosphate to give one mole of tetra-alkyl diphosphate and two mols of alkyl chloride. The phosphorus or phosphorus chloride ($PCl_3$ or $PCl_5$) which is present in the reaction zone acts apparently as a chlorine carrier. It facilitates and improves the production of the toxic tetra ester. The group phosphorus-phosphorus chloride may be termed for convenience "phosphoric chlorine carriers."

Other reactions occur, however, and the liquid product contains, in addition to the diphosphate, phosphorus compounds of undetermined structure. In practice the liquid product also usually contains some unreacted trialkyl phosphate. The gaseous alkyl chloride evolved separates readily and may be allowed to escape to the atmosphere or recovered by refrigeration or other means.

The aforesaid tetra ester isolated by molecular distillation has extremely high insecticidal power, whereas the undistilled residue possesses substantially none. Within the limits of analytical error this distillate corresponds in molecular weight and empirical formula to that of the tetra ester as described. It reacts with potassium iodide to liberate iodine, and it decolorizes potassium permanganate solution. After a short induction period it decomposes rapidly at 150° C., even under very high vacuum, and slowly at temperatures as low as 100° C.

While the hereindescribed process may be carried out primarily for the production of material to be used as the toxic ingredient of insecticides and, as stated, the toxicity resides for the most part in the tetra alkyl ester of diphosphoric acid contained in the reaction product, it is not necessary that the ester be separated for such use. The entire product may be so used (although we prefer first to remove from it any dissolved and entrained chlorine it may contain). By the method of our invention we are able to manufacture a product having a high insecticidal potency, that is, containing a high percentage of the tetra ester described above, by a practical, economical continuous operation.

Various means may be used for contacting the chlorine, phosphorus (or phosphorus chloride) and trialkyl phosphate. For best results such means should provide for intimate contact in a reasonably brief time and should be such that time and temperature can be controlled. We prefer, especially for continuous operation, a vertical column into the upper portion of which trialkyl phosphate and phosphorus (or phosphorus chloride) are continuously introduced and into the lower portion of which chlorine gas is continuously introduced. The reactants thus flow countercurrently. Intimate mixing is provided by suitable packing or baffled construction within the column. We prefer for this purpose to use a type of packing which minimizes liquid "hold up" within the column. For example, the column may contain hollow rings of glass, ceramic or other unreactive material placed in a random manner. We provide means for establishing and controlling the reaction temperature, either by controlling the temperature of the materials entering the reaction zone or by controlling the temperature within the zone itself, or by a combination of these steps. For example, when a countercurrent column is used, it may be equipped with a thermal jacket, with internal coils, with electrical heating means, or with any similar device whereby the temperature of the reacting materials may be maintained at the desired point.

When the process is carried out with the addition of phosphorus we make use of phosphorus in powdered or colloidal form. When $PCl_3$ is used it is added in its normal liquid state to the trialkyl phosphate or directly into the reactor. When PCl₅ (a crystalline solid) is used we prefer to dissolve the desired amount in the trialkyl phosphate outside the reactor and feed the solution, although it may be introduced directly into the reactor if desired.

We also make provision for the removal of gas from the reaction zone. When the reaction zone is in the form of a countercurrent column, a gas outlet is provided in the upper portion, preferably above the point at which trialkyl phosphate is introduced. The gas so released consists for the most part of alkyl chloride which is one of the reaction products. It may also contain varying quantities of unreacted chlorine and small quantities of other reaction products.

The liquid reaction product which collects in the lower portion of the column usually contains some entrained or dissolved chlorine. When the product is to be used for insecticidal compounding we find it desirable to remove chlorine and any other gaseous material which may be associated with it. A convenient method for so doing consists in passing the liquid product through a vaporizing zone held at a moderately sub-atmospheric pressure.

We have found that the above-described reaction may be carried out within the temperature range of 100 to 150° C. We prefer for best results to maintain the reaction temperature within the range 120 to 140° C. In speaking of the reaction temperature we refer to the maximum temperature within the reaction zone. We find that this maximum temperature, in the case of a vertical countercurrent column, occurs at a point not far removed from the point of chlorine introduction, i. e., in the lower portion of the column. The course of the reaction is influenced by the time of contact as well as by the temperature. If the apparatus and conditions of its operation are such as to afford a relatively long time of contact, the maximum temperature which can be tolerated and which is conducive to maximum yield of desired product, is lower than in cases where the contact time is short. We prefer to carry out the above-described reaction under conditions which will provide a time of reaction of from 2 to 5 minutes, and when so operating we have found that a maximum reaction temperature of about 130° C. gives good results. If, however, a contact time of 10 to 15 minutes exists, we would use a lower temperature of the order of 100 to 110° C.

The weight ratio of chlorine and trialkyl phosphate needed to satisfy the desired reaction, i. e., the synthesis of tetra alkyl diphosphoric ester, is one mole of chlorine to two moles of trialkyl phosphate. It is not essential, however, that the materials be added in these proportions in order to obtain a reaction product having the properties described. It may, in view of the construction of the apparatus and the conditions of its use, be desirable in some cases to use more chlorine than stated above in order to secure adequate contacting with all of the trialkyl phosphate. On the other hand, if the apparatus and its operation are such that the time-temperature factor applied to the reaction is high, there is a tendency for secondary reaction of chlorine with the desired tetra ester. In such circumstances we minimize this tendency by reducing the relative amount of chlorine present in the reaction zone, using less than one mole of chlorine per two moles of trialkyl phosphate. This variation of weight ratios of the reactants and the selection of an optimum ratio is of importance only insofar as it relates to the yield of the desired diphosphoric ester. It is not determinative of the synthesis of such ester.

The amount of phosphorus or phosphorus chloride (either the trichloride, PCl₃, or the pentachloride, PCl₅, or both) needed to improve the yield and smoothness of the synthesis is small. As little as 2% (based on the weight of trialkyl phosphate used) is effective, although we prefer to use about 5%. Increase of concentration above about 10% appears to confer no appreciable added benefit. Our preferred method is to add the chloride, preferably in the form of PCl₃, at the rate of about 5% by weight, to the trialkyl phosphate fed to the reaction zone.

The following is an example of a practical embodiment of the method of our invention. The apparatus consisted essentially of a vertical reaction column having a length approximately ten times its diameter. This column was provided at the top with a gas outlet line and, near the top but below the outlet line it was provided with a reagent inlet. It was provided at the bottom with a product outlet line and, near the bottom but elevated above the outlet line, with a chlorine inlet. The column was equipped with an annular electrically heated jacket. The column was packed substantially throughout its length with glass rings placed in a random manner. Conventional means were provided for indicating temperatures at the inlet and outlet of the jacket and at several points within the column. Likewise, conventional means for indicating and regulating the flow of materials entering the column and the jacket were provided.

Preheated liquid triethyl phosphate, $(C_2H_5)_3PO_4$, containing 5% by weight of phosphorus trichloride, PCl₃, was preheated to about 120° C. and introduced through the upper inlet line simultaneously with the introduction of chlorine gas through the lower inlet line. The jacket was maintained at a temperature such that the maximum temperature within the column was held steady at about 130° C. Gas was released from the top outlet at atmospheric pressure, and liquid product was withdrawn from the bottom outlet at such a rate as to maintain a low liquid level within the column. The liquid withdrawn from the column was passed through the vessel maintained at about one-half atmospheric pressure. This low pressure vessel was constructed so as to permit the incoming liquid to fall over baffles and so facilitate the release of dissolved chlorine. Following this dechlorination, the liquid product was run to storage. The rates of chlorine and triethyl phosphate were adjusted and controlled so as to maintain a weight ratio of chlorine to phosphate of about 70 to 364 (i. e., about 1 mole of chlorine per 2 moles of triethyl phosphate).

The gas released from the top of the reaction column consisted largely of ethyl chloride plus a small amount of chlorine. The dechlorinated liquid product was colorless to light amber. It had a density of 1.18 to 1.25. It was soluble in chloroform, ketones and alcohol, but insoluble in petroleum distillates. It dissolved in water with decomposition. It corroded brass and mild steel actively, but reacted comparatively slightly at atmospheric temperature with stainless steel or aluminum. By subjecting this reaction product to a temperature of 100 to 120° C., at an absolute pressure of 1 to 2 microns Hg in a falling film type molecular still a distillate yield of 92% of the charge was obtained, consisting of tetra ethyl diphosphate, density 1.1983 at 20° C., refractive index 1-4190 at 22-5° C., molecular weight 304 (boiling point method) to 310 (freezing point method)—theoretical 306. Comparative biological tests showed this substance to have 1.1 times the toxicity of the total reaction product. The undistilled residue from this molecular distillation was a liquid having an average molecular weight much higher than 306 and possessed substantially no insecticidal power. Hence biological testing of the total reaction product carried out by carefully controlled standardized procedures furnishes a good measure of the amount of tetra ethyl diphosphate contained therein.

When the process of our invention is carried out primarily for the production of material to be used in compounding insecticides, we prefer to use triethyl phosphate as a starting material, thus synthesizing a product containing a substantial amount of the tetra ethyl ester described above. Valuable insecticidal products can be made by the hereindescribed reaction, however, when other alkyl phosphates are employed. We have found that such valuable insecticidal products result from the use of trialkyl phosphates in which the alkyl radical contains 1, 2 or 3 carbon atoms, that is, trimethyl-, triethyl, tripropyl, or tri-isopropyl phosphate. The toxic principle contained in the reaction product is therefore tetramethyl-, tetraethyl, tetrapropyl or tetraisopropyl diphosphate as the case may be. The use of trialkyl phosphates in which the alkyl radical contains 4 or more carbon atoms yields products which are inferior for insecticidal use.

Alkyl chloride is a valuable product of the reaction described herein. It is particularly desirable when carrying out this process with the ethyl ester to recover the ethyl chloride produced by the reaction.

We claim:

1. A process for the preparation of a tetra-alkyl ester of diphosphoric acid which comprises heating to a temperature of 100–150° C. an intimate mixture consisting essentially of a trialkyl phosphate, chlorine and at least one member selected from the group consisting of elemental phosphorus, phosphorus trichloride and phosphorus pentachloride.

2. A process for the preparation of a tetra-alkyl ester of diphosphoric acid which comprises heating to a temperature of 120–140° C. an intimate mixture consisting essentially of a trialkyl phosphate, chlorine and at least one member selected from the group consisting of elemental phosphorus, phosphorus trichloride and phosphorus pentachloride.

3. A process for the preparation of a tetra-alkyl ester of diphosphoric acid which comprises heating to a temperature of 100–150° C. an intimate mixture consisting essentially of a trialkyl phosphate in which the alkyl radicals contain from 1 to 3 carbon atoms, chlorine and at least one member selected from the group consisting of elemental phosphorus, phosphorus trichloride and phosphorus pentachloride.

4. A process for the preparation of a tetraethyl ester of diphosphoric acid which comprises heating to a temperature of 100–150° C. an intimate mixture consisting essentially of triethyl phosphate, chlorine and at least one member selected from the group consisting of elemental phosphorus, phosphorus trichloride and phosphorus pentachloride.

5. A process for the preparation of a tetraethyl ester of diphosphoric acid which comprises heating to a temperature of 120–140° C. an intimate mixture consisting essentially of triethyl phosphate, chlorine and at least one member selected from the group consisting of elemental phosphorus, phosphorus trichloride and phosphorus pentachloride.

6. A process for the preparation of a tetra-alkyl ester of diphosphoric acid which comprises heating to a temperature of 100–150° C. an intimate mixture consisting essentially of trialkyl phosphate, chlorine and phosphorus trichloride.

7. A process for the preparation of a tetra-alkyl ester of diphosphoric acid which comprises heating to a temperature of 100–150° C. an intimate mixture consisting essentially of a trialkyl phosphate, chlorine and at least one member selected from the group consisting of elemental phosphorus, phosphorus trichloride and phosphorus pentachloride, separately removing from the reaction zone the gaseous and liquid reaction products and passing said liquid product through a subatmospheric pressure zone.

LEONARD W. HARRIS.
GEORGE R. SANDERS.
JAMES W. HANSEN.

REFERENCES CITED

The following references are of record in the file of this patent:

UNITED STATES PATENTS

| Number | Name | Date |
| --- | --- | --- |
| Re. 20,411 | Romieux et al. | June 15, 1937 |
| 1,763,852 | Johnson | June 17, 1930 |
| 2,060,815 | MacAfee | Nov. 17, 1936 |
| 2,063,629 | Salzberg et al. | Dec. 8, 1936 |
| 2,343,831 | Osborne | Mar. 7, 1944 |
| 2,370,786 | Fox | Mar. 6, 1945 |
| 2,373,670 | Engelke | Apr. 17, 1945 |

OTHER REFERENCES

Bernthsen-Sudborough, "Textbook of Organic Chemistry," (1931 ed.) page 384.

Gerrard, "Jour. Chem. Soc. (London)," vol. 1940, page 1466.